United States Patent [19]
Balakrishnan

[11] Patent Number: 5,812,344
[45] Date of Patent: Sep. 22, 1998

[54] SUSPENSION WITH INTEGRATED CONDUCTOR TRACE ARRAY HAVING OPTIMIZED CROSS-SECTIONAL HIGH FREQUENCY CURRENT DENSITY

[75] Inventor: Arun Balakrishnan, Fremont, Calif.

[73] Assignee: Quantum Corporation, Milpitas, Calif.

[21] Appl. No.: 855,809

[22] Filed: May 12, 1997

[51] Int. Cl.⁶ ........................................................ G11B 5/48
[52] U.S. Cl. ............................................ 360/104; 375/257
[58] Field of Search ................................ 360/104, 97.01; 375/257

[56] References Cited

U.S. PATENT DOCUMENTS 5,006,946  4/1991  Matsuzaki ............................ 360/104
5,491,597  2/1996  Bennin et al. ........................ 360/104

Primary Examiner—A. J. Heinz
Attorney, Agent, or Firm—David B. Harrison; Debra A. Chun

[57] ABSTRACT

A head suspension has a segmented trace conductor array for electrically interconnecting a read/write head to electronic circuitry in a disk drive. Each trace segment has a predetermined generally rectangular cross-sectional area such that the intermediate first segment has a predetermined cross-sectional width greater than a predetermined cross-sectional width of an first outer segment, in order to optimize current density at very high signaling frequencies associated with information transfer between the head and the read/write circuitry.

15 Claims, 5 Drawing Sheets

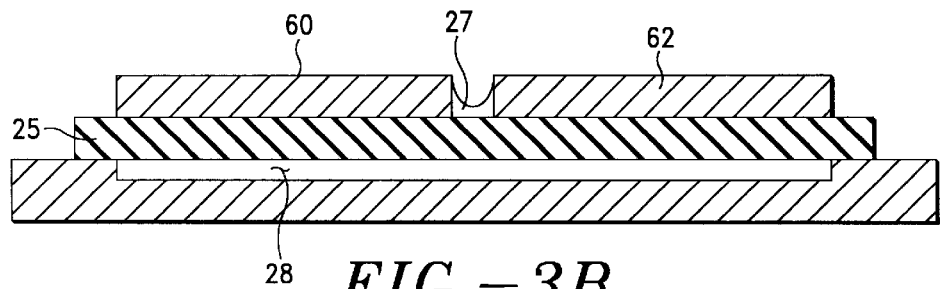
FIG.—3B
(PRIOR ART)
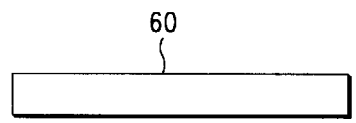
FIG.—4
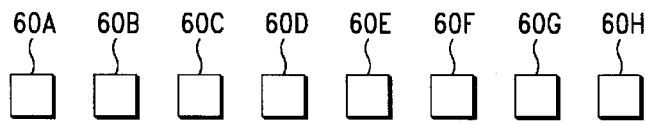
FIG.—8
FIG.—5
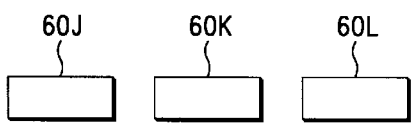
FIG.—9
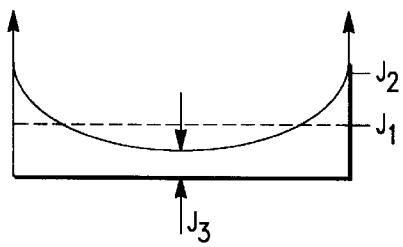
FIG.—6
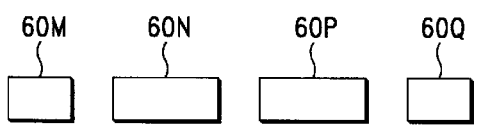
FIG.—10
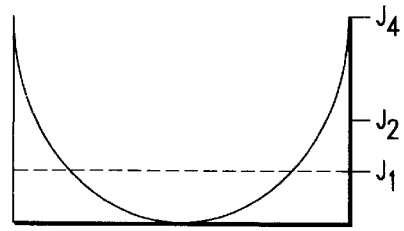
FIG.—7
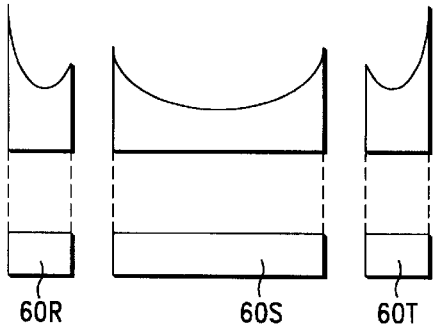
FIG.—11

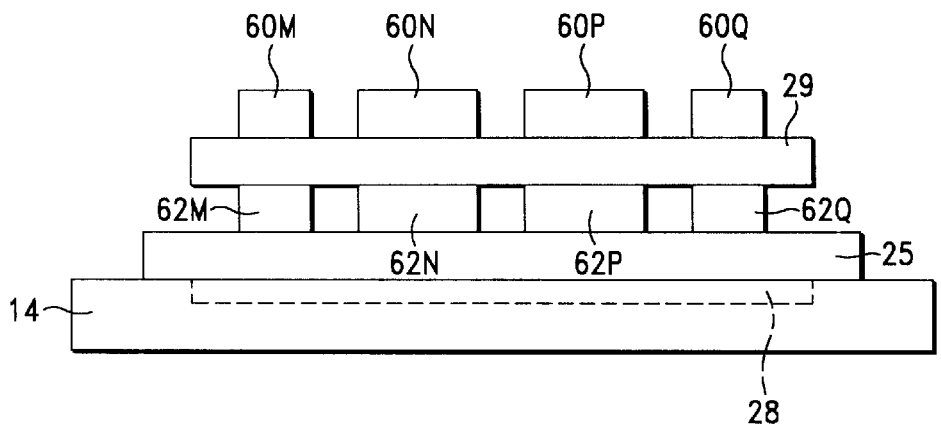
*FIG.—12*
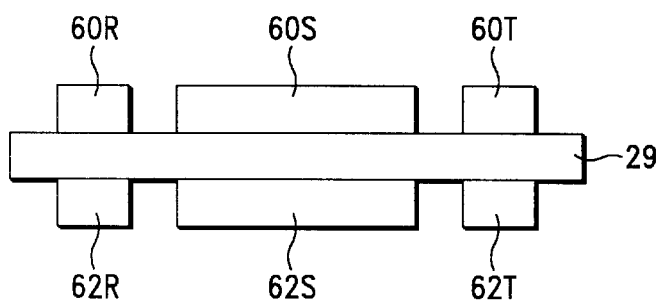
*FIG.—13*
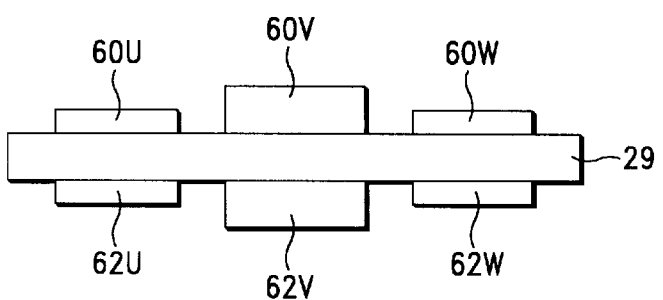
*FIG.—14*

SUSPENSION WITH INTEGRATED CONDUCTOR TRACE ARRAY HAVING OPTIMIZED CROSS-SECTIONAL HIGH FREQUENCY CURRENT DENSITY

FIELD OF THE INVENTION

This invention relates generally to structure and method for optimizing cross-sectional high frequency current density in a trace conductor array within a head suspension assembly. More particularly, the present invention relates to an integrated suspension and longitudinally-segmented conductor trace array wherein the suspension trace segments have effective widths contoured to maximize high frequency current density as measured across a cross-section of the array.

BACKGROUND OF THE INVENTION

Contemporary disk drives typically include a rotating rigid storage disk and a head positioner for positioning a data transducer at different radial locations relative to the axis of rotation of the disk, thereby defining numerous concentric data storage tracks on each recording surface of the disk. The head positioner is typically referred to as an actuator. Although numerous actuator structures are known in the art, in-line rotary voice coil actuators are now most frequently employed due to their simplicity, high performance, and their ability to be mass balanced about their axis of rotation, the latter being important for making the actuator less sensitive to perturbations. A closed-loop servo system within the disk drive is conventionally employed to operate the voice coil actuator and thereby position the heads with respect to the disk surface.

The read/write transducer, which may be of a single or dual element design, is typically deposited upon a ceramic slider structure having an air bearing surface for supporting the transducer at a minute distance from the surface of the moving medium. Single write/read element designs typically require two wire connections while dual designs having separate reader and writer elements require four wire connections. Magnetoresistive (MR) heads in particular generally require four wires. The combination of an air bearing slider and a read/write transducer is also known as a read/write head or a recording head.

Sliders are generally mounted to a gimbaled flexure structure attached to the distal end of a suspension's load beam structure. A spring biases the load beam and the head towards the disk, while the air pressure beneath the head pushes the head away from the disk. An equilibrium distance defines an "air bearing" and determines the "flying height" of the head. By utilizing an air bearing to support the head away from the disk surface, the head operates in a hydrodynamically lubricated regime at the head/disk interface rather than in a boundary lubricated regime. The air bearing maintains a spacing between the transducer and the medium which reduces transducer efficiency. However, the avoidance of direct contact vastly improves the reliability and useful life of the head and disk components. Demand for increased areal densities may nonetheless require that heads be operated in pseudo contact or even boundary lubricated contact regimes, however.

Currently, slider flying heights at the trailing edge are on the order of 0.5 to 2 microinches. The magnetic storage density increases as the head approaches the storage surface of the disk. Thus, a very low flying height is traded against device reliability over a reasonable service life of the disk drive. At the same time, data transfer rates to and from the storage surface are increasing; and, data rates approaching 200 megabits per second are within practical contemplation.

The disk drive industry has been progressively decreasing the size and mass of the slider structures in order to reduce the moving mass of the actuator assembly and to permit closer operation of the transducer to the disk surface, the former giving rise to improved seek performance and the latter giving rise to improved transducer efficiency that can then be traded for higher areal density. The size (and therefore mass) of a slider is usually characterized with reference to a so-called standard 100% slider ("minislider"). The terms 70%, 50%, and 30% slider ("microslider", "nanoslider", and "picoslider", respectively) therefore refer to more recent low mass sliders that have linear dimensions that are scaled by the applicable percentage relative to the linear dimensions of a standard minislider. Smaller slider structures generally require more compliant gimbals, hence the intrinsic stiffness of the conductor wires attached to the slider can give rise to a significant undesired bias effect.

To reduce the effects of this intrinsic wire stiffness or bias, integrated flexure/conductor structures have been proposed which effectively integrate the wires with an insulating flexible polymeric resinous flexure such that the conductors are exposed at bonding pads positioned at the distal end of the flexure in the proximity of the head. U.S. Pat. No. 5,006,946 to Matsuzaki discloses an example of such a configuration. U.S. Pat. No. 5,491,597 to Bennin et al. discloses a further example in point. While such wiring configurations do enjoy certain performance and assembly advantages, the introduction of the disclosed flexible polymeric resinous material in the flexure and gimbal structure raises a number of challenging design issues. For example, the thermal expansion properties of the resinous material is not the same as the prior art stainless steel structures; and, the long-term durability of such resinous structures, including any requisite adhesive layers, is unknown. Therefore, hybrid stainless steel flexure and conductor structures have been proposed which incorporate most of the benefits of the integrated conductor flex-circuit flexure structures while remaining largely compatible with prior art fabrication and load beam attachment methods. Such hybrid designs typically employ stainless steel flexures having deposited insulating and conductive trace layers for electrical interconnection of the head to the associated drive electronics, e.g., a proximately located preamplifier chip and downstream read channel circuitry typically carried on a circuit board (along with other circuitry) attached to the head/disk assembly.

As taught by U.S. Pat. No. 5,491,597 to Bennin et al., entitled: "Gimbal Flexure and Electrical Interconnect Assembly", the disclosed prior approach called for use of a spring material for the conductive trace layers, such as beryllium-copper alloy, which admittedly has higher electrical resistance than pure annealed copper, for example. On the other hand, pure annealed copper, while a satisfactory electrical conductor at high frequencies, also manifests high ductility rather than spring-like mechanical resilience, and therefore lacks certain mechanical spring properties desired in the interconnect trace material. Traces formed of pure copper plated or deposited onto e.g. a nickel base layer provide one alternative to the beryllium-copper alloy relied upon by the Bennin et al. approach.

These hybrid flexure designs employ relatively lengthy runs of conductor trace pairs or four-wire sets which extend from bonding pads at the distal, head-mounting end of the flexure to the proximal end of the flexure, to provide a conductive path from the read/write head along the length of the associated suspension structure to the preamplifier or read-channel chip(s). Because the conductor traces are positioned extremely close to, but electrically isolated from, the conductive stainless steel flexure structure which is in turn grounded to the load beam, and because of the relatively high signal rates being transferred, the conductor trace inductance and mutual coupling, as well as conductor trace resistance and trace capacitance to ground, can give rise to unwanted signal reflections, distortion, and inefficient signal/power transfer. The unwanted signal reflections tend to deleteriously affect the performance of the read/write head, interconnect structure, and driver/preamplifier circuit.

Micro strip line technology teaches that the loop and inter-conductor capacitance may be changed by changing the dimensions of and/or spacing between micro strips forming a transmission line. However, in the case of integrated trace array wiring schemes for use with head suspension load beams, the dimensions of the conductors are governed by mechanical constraints including the space available on the flexure for the trace interconnect array, and the trace conductor dimensions cannot be changed very much insofar as impedance matching or tuning is concerned.

The invention to be described provides, inter alia, an integrated head suspension and longitudinally-segmented conductor trace array wherein the suspension trace segments have effective cross-sectional widths contoured to match high frequency current density as measured across a cross-section of the array.

SUMMARY OF THE INVENTION WITH OBJECTS

A general object of the present invention is to provide a multiple segmented conductor trace array for electrically interconnecting a read/write head to associated read/write circuitry in a manner which concentrates current density at high signaling rates thereby reducing losses otherwise attributable to skin effect at the signaling rates in a manner overcoming limitations and drawbacks of the prior art.

A more specific object of the present invention is to provide a segmented trace interconnect array for a head suspension assembly of a disk drive in which the suspension trace segments have effective cross-sectional widths contoured to maximize high frequency current density across a cross-section of the array.

Another specific object of the present invention is to control spacing between, and cross-sectional areas of conductive trace segments of a trace interconnect array.

Yet another specific object of the present invention is to provide a trace interconnect array having an optimized conductor layout geometry with asymmetrical cross-sectional areas among conductive segments which keeps current-distribution uniform over a desired range of operating high frequencies such that resistance and inductance parameters will also stay reasonably constant over the same frequency range and thereby reducing any unpredictable or unwanted phase delays in a service loop including the trace interconnect array.

Yet one more specific object of the present invention is to provide optimized constant current density across segments of a trace conductor array providing a single service loop in order to make optimal use of the trace conductor material, which means that conductors may be made narrower than otherwise and provide improved signal transmission performance at very high operating frequencies.

In summary an integrated load beam assembly supports a read/write head/slider assembly adjacent to a storage medium such as a rotating data storage disk within a disk drive. Additionally, the assembly electrically interconnects the head to read/write circuitry of the disk drive. In this aspect of the invention, the load beam assembly includes a generally planar conductive member extending to proximity of the read/write head/slider assembly; a first electrical insulation layer disposed on the conductive member; and at least a first electrical trace path disposed on the first electrical insulation layer. The first electrical trace path comprises at least three longitudinal first trace conductor segments. The first trace segments are connected in parallel at terminal ends and include two outer first trace segments and at least one intermediate first trace segment. In accordance with principles of the present invention, each first segment has a predetermined generally rectangular cross-sectional area such that the intermediate first segment has a predetermined cross-sectional width greater than a predetermined cross-sectional width of an first outer segment, in order to optimize current density at very high signaling frequencies associated with information transfer between the head and the read/write circuitry.

In this aspect of the invention a second electrical insulation layer may be formed or deposited over the segments forming the first electrical trace path, and a second electrical trace path may be formed on the second electrical insulation layer in general longitudinal alignment with the first electrical trace path. The second electrical trace path preferably comprises at least three longitudinal second trace conductor segments similar to the three longitudinal first trace conductor segments. In other words, the second segments are connected in parallel at terminal ends and there are two outer second segments and at least one intermediate second segment. Each second segment has a predetermined generally rectangular cross-sectional width, and the at least one intermediate second segment has a predetermined cross-sectional width greater than a predetermined cross-sectional width of a second outer segment in order to optimize current density at the very high signaling frequencies.

As a further aspect of the invention a trace interconnect array connects a data transducer to electronics circuitry within a data storage device such as a hard disk drive. In this aspect, the trace interconnect array includes a support substrate for supporting a thin dielectric layer. Two conductive trace signal paths form a service loop between a read or write element of the data transducer and the electronics circuitry. Each conductive trace signal path comprises at least three segments formed on the thin dielectric layer: two outer segments and one or more intermediate segments. In accordance with principles of the present invention the cross-sectional width of the intermediate segment is greater than cross-sectional widths of each of the two outer segments in order to concentrate current density into the at least one intermediate segment in accordance with skin effect at a signaling frequency of information between the data transducer and the electronics circuitry across the service loop.

As a related aspect of the present invention the two conductive trace signal paths comprise a first path having trace segments formed on one surface of the thin dielectric layer and a second path having trace segments formed on an opposite surface of the thin dielectric layer in general longitudinal alignment with the trace segments of the first path.

In accordance with a further aspect of the present invention a disk drive comprises a base, at least one data storage disk rotating relatively to the base, a voice coil actuator positionable relative to the base and having at least one head arm, a load beam structure attached to a distal end of the at least one head arm, and an air bearing slider attached to a distal end of the load beam via a gimbal with the data transducer being formed on a trailing edge of the air bearing slider. A trace interconnect array in accordance with principles of the present invention interconnects the data transducer and the electronics circuitry mounted with respect to the base. Within this aspect the voice coil actuator preferably comprises a rotary voice coil actuator and the electronics circuitry preferably comprises at least one chip mounted on a side wall of the rotary voice coil actuator.

These and other objects, advantages, aspects, and features of the present invention will be more fully appreciated and understood upon consideration of the following detailed description of preferred embodiments presented in conjunction with the accompanying drawings.

BRIEF DESCRIPTION OF THE DRAWINGS

In the Drawings:

FIG. 3B is a greatly enlarged view in elevation and cross-section taken along section line 3B—3B in FIG. 3, showing a conventional trace interconnect conductor pair.

FIG. 4 is a greatly enlarged cross-sectional view of one of the conductor traces of the FIG. 3B trace interconnect array, depicted in the absence of current flow.

FIG. 5 is a diagrammatic view of the FIG. 4 conductor cross-section, showing current density at DC.

FIG. 6 is a diagrammatic view of the FIG. 4 conductor cross-section showing current density at relatively high frequency alternating current.

FIG. 7 is a diagrammatic cross-sectional view of the FIG. 4 conductor showing current density at very high frequency alternating current.

FIG. 8 is a diagrammatic cross-sectional view of the FIG. 4 conductor which has been divided up into multiple smaller cross-sectional segments connected in parallel in order to achieve desired improvement in certain electrical parameters associated with the conductor.

FIG. 9 is a diagrammatic cross-sectional view of the FIG. 4 conductor which has been divided up into several cross-sectional segments which are larger than the FIG. 8 cross-sectional segments in order to achieve other desired improvements in certain electrical parameters associated with the conductor.

FIG. 10 is a diagrammatic cross-sectional view of an embodiment of the present invention in which the FIG. 4 conductor has been divided up into plural segments of differing cross-sectional areas in order to obtain improvement in current density at very high frequency alternating current.

FIG. 11 is a diagrammatic cross-sectional view of an alternative embodiment of the present invention in which the FIG. 4 conductor has been divided up into several segments of differing cross-sectional areas in order to obtain improvement in current density at very high frequency alternating current which is also plotted in relation to the illustrated trace conductor geometry in this figure.

FIG. 12 is a diagrammatic cross-sectional view of the FIG. 10 embodiment comprising a multi-level trace interconnect array.

FIG. 13 is a diagrammatic cross-sectional view of the FIG. 11 embodiment comprising a multi-level trace interconnect array.

FIG. 14 is a diagrammatic cross-sectional view showing an alternative embodiment of multi-level trace interconnect array incorporating principles of the present invention.

DETAILED DESCRIPTION OF PREFERRED EMBODIMENTS

Figure 1:
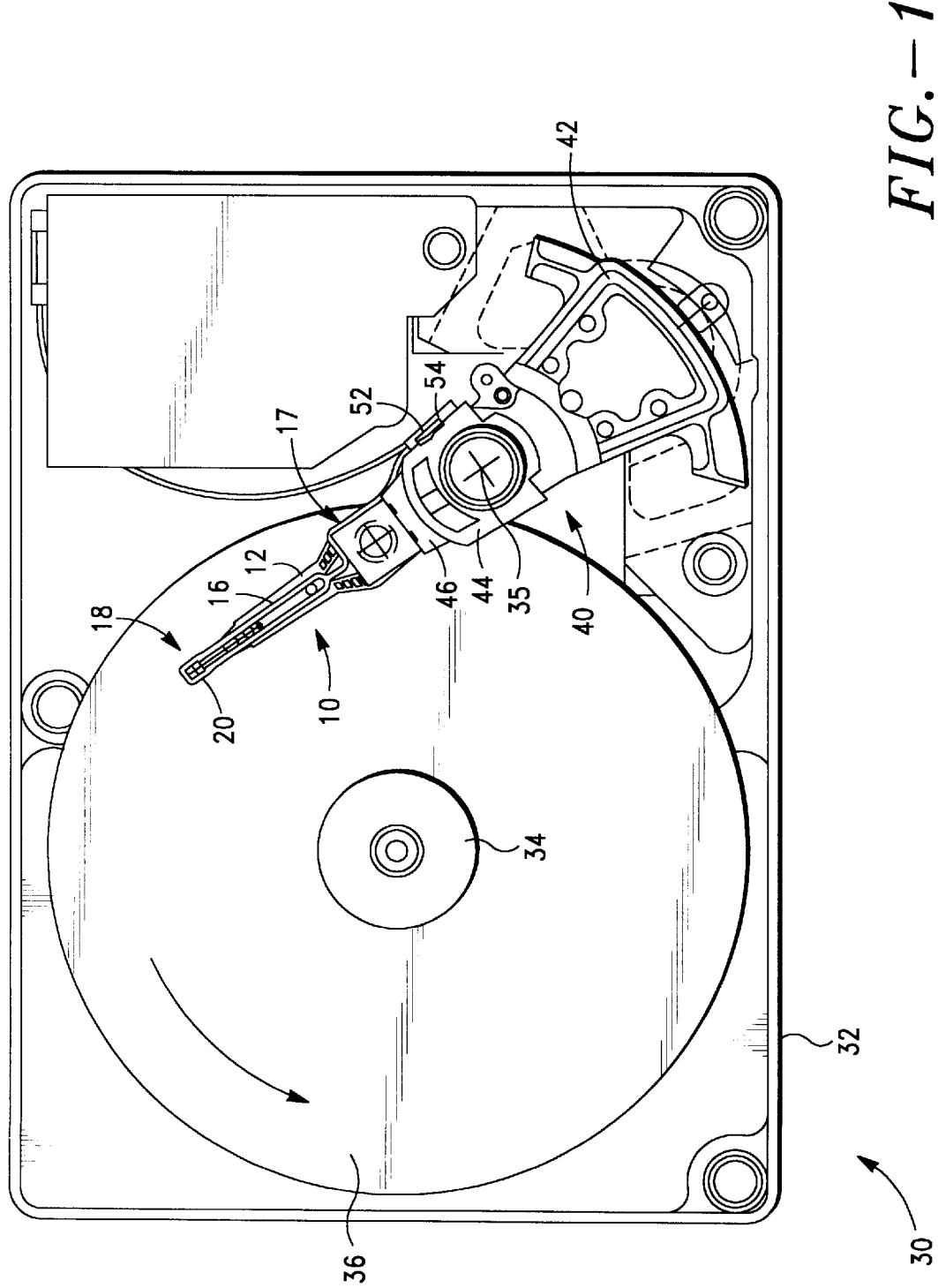
FIG. 1 is an enlarged, diagrammatic plan view of a disk drive including a suspension assembly having a conductor trace array incorporating principles of the present invention.
Figure 2:
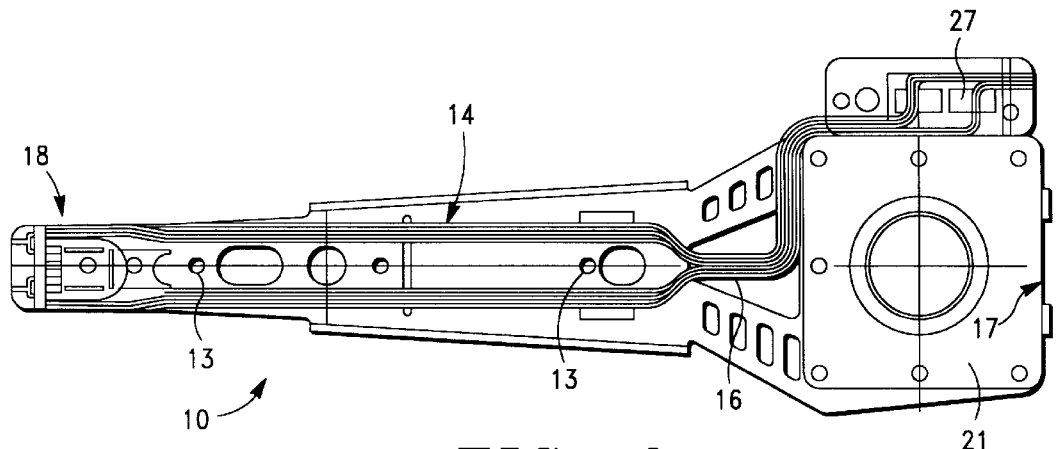
FIG. 2 is an enlarged diagrammatic plan view of an integrated flexure/conductor load beam structure having conductive traces in accordance with principles of the present invention.

Referring to the drawings, where like characters designate like or corresponding parts throughout the views, FIG. 1 presents a diagrammatic top plan view of a head/disk assembly (HDA) of a hard disk drive 30. The hard disk drive 30 employs at least one load beam assembly 10 having a flexure 14 including a trace interconnect array 16 as a first preferred embodiment of the present invention. FIG. 1 shows the load beam assembly 10 with the flexure 14 and trace interconnect array 16 employed within its intended operating environment.

In the present example disk drive 30 includes e.g. a rigid base 32 supporting a spindle 34 (and spindle motor, not shown) for rotating at least one data storage disk in a direction shown by the curved arrow. The data storage disk may implement magnetic, magneto-optical, or optical storage technologies. A magnetic data storage disk 36 is illustrated as a presently preferred embodiment. Drive 30 also includes a rotary actuator assembly 40 rotationally mounted to the base 32 at a pivot point 35. The actuator assembly 40 includes a voice coil 42 which, when selectively energized by control circuitry (not shown), moves and thereby positions an actuator E-block 44 and head arms 46 (and load beam assemblies 10) at radial track positions defined on the facing surfaces of storage disks 36. At least one of the load beam assemblies 10 is secured at its proximal end 17 to a distal end of a head arm 46, e.g. by conventional ball-swaging techniques.

Conventionally, but not necessarily, two load beam assemblies 10 are attached to head arms 46 between disks 36; and, one load beam structure 10 is attached to head arms above and below the uppermost and lowermost disks of a disk stack comprised of multiple disks 36 spaced apart on spindle 34. The interconnect structure 16 connects to a flexible trace/film segment 50 which extends to a ceramic hybrid circuit substrate 52 secured to a side of the E-block 44. The ceramic hybrid circuit 52 secures and connects a semiconductor chip 54 forming a read preamplifier/write driver circuit. Most preferably, the chip 54 is nested between the ceramic substrate of the hybrid circuit 52 and the E-block sidewall, and is secured to the sidewall by a suitable conductive adhesive or thermal transfer compound such that heat generated during operation of the chip 54 is dissipated into the E-block by conduction, and outwardly into the ambient air volume by convection.

Figure 3:
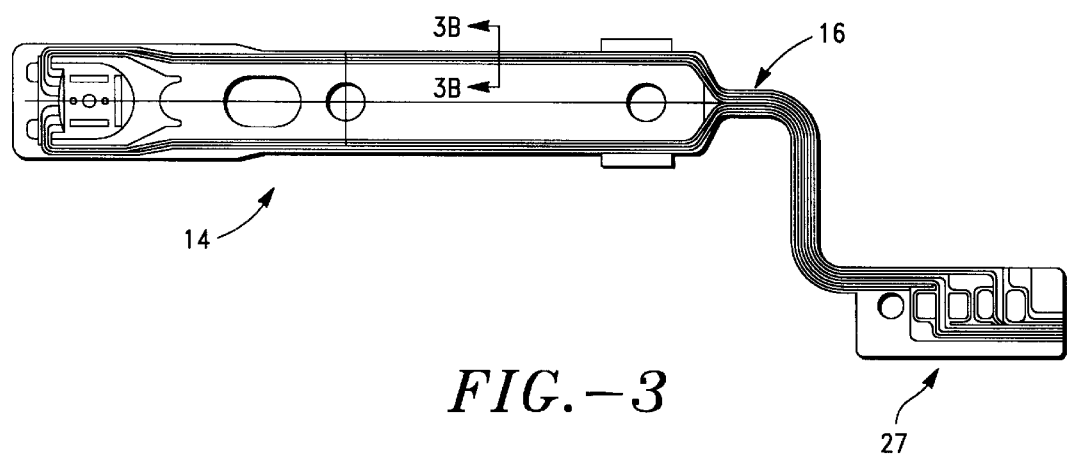
FIG. 3 is an enlarged plan view of a flexure of the FIG. 2 load beam structure having integral wiring incorporating the conductive trace array.
Figure 3A:
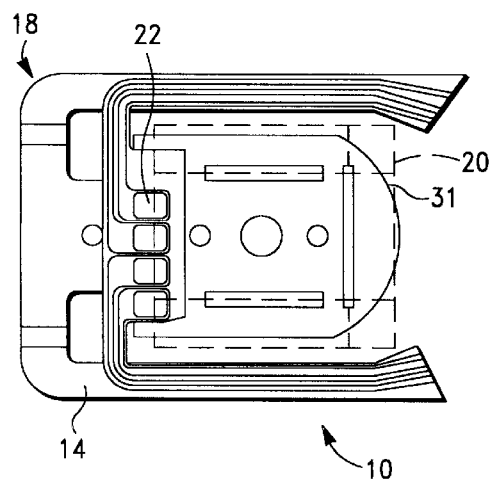
FIG. 3A is a greatly enlarged plan view of a read/write head connection region of the FIG. 3 flexure trace array and wherein the head slider is shown in dashed line outline.
Figure 3C:
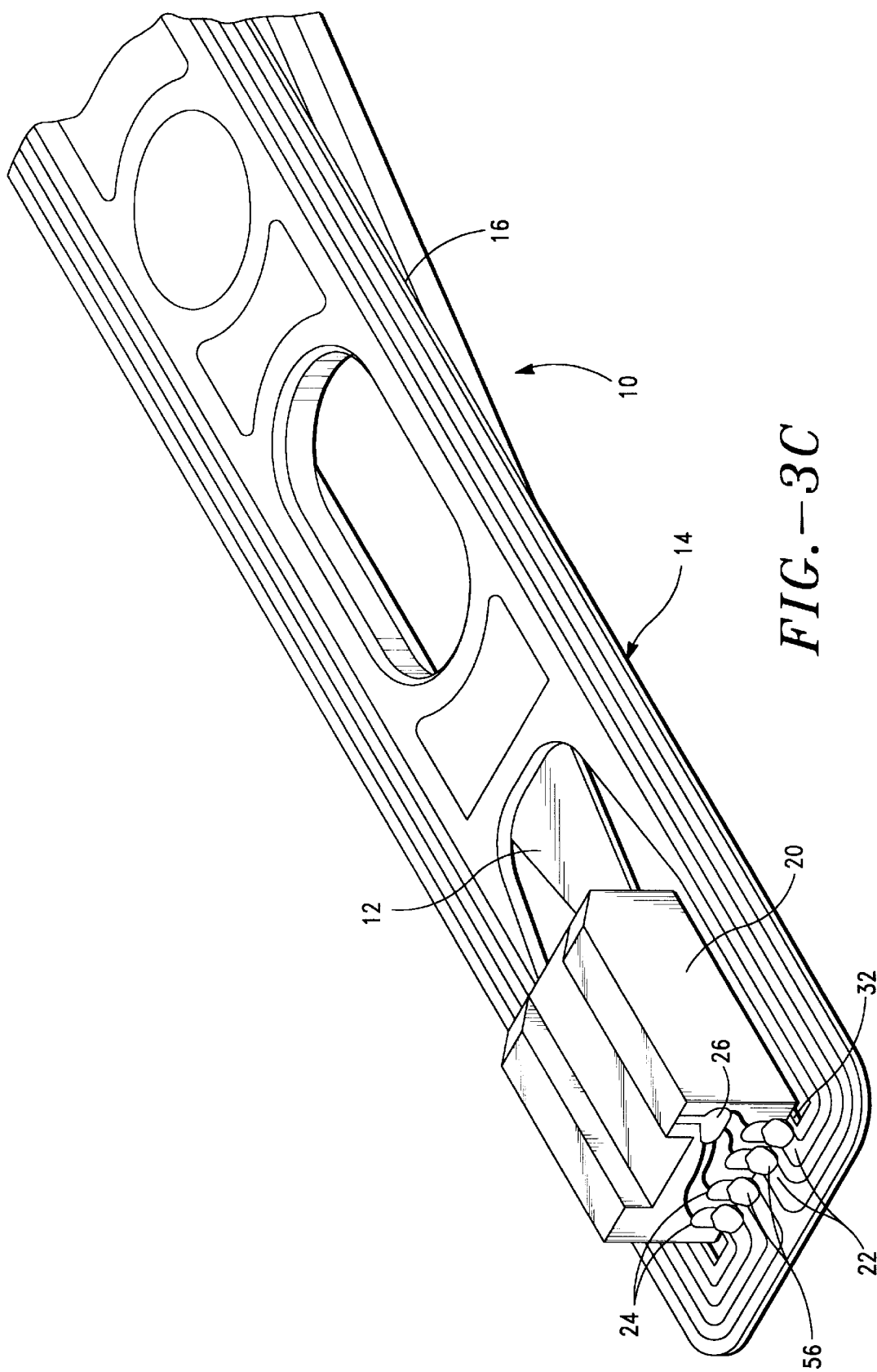
FIG. 3C is a greatly enlarged view in perspective of a slider end of the FIG. 2 load beam structure showing the slider attached to the flexure gimbal, and showing electrical gold ball connections between the flexure trace array and the read/write head connection pads of the slider.

As shown in FIGS. 2, 3, 3A, 3B and 3C, the load beam assembly 10 includes a generally planar formed stainless steel load beam 12 and a flexure 14. In the present example, the flexure 14 is formed of thin stainless steel sheet material which is e.g. approximately 20-microns thick. An array of two pairs of conductive traces 60 and 62 of approximately 10-microns thick copper conductor forms part of an interconnect structure 16 which extends from the proximal end 17 of flexure 14 to another connection pad array 22 located at the slider-supporting distal end 18 of the load beam assembly 10. A transducer head slider 20 is attached to the gimbal 14 by a suitable adhesive at the distal end 18 of the load beam structure 10. The slider body 20 defines an air bearing surface which flies in very close proximity to a data storage surface of the disk 36 by virtue of an air bearing which forms during rotation of the disk 36 relative to the slider 20. As shown in FIG. 3C the connection pads 22 at the distal end 18 are provided for connection by e.g. ultrasonically-welded gold ball bonds 56 to aligned connection pads 24 of e.g. a dual-element (four conductor) thin film magneto-resistive read/write structure 26 formed on a trailing edge of the slider body 20. Preferably, although not necessarily, the slider body 20 is a 30% slider, or smaller.

Interconnect structure 16 includes a high dielectric polyimide film base 25 interposed between the conductive traces 60 and 62 of the conductor array 16 mounted to the stainless steel flexure 14. The dielectric polyimide film layer is preferably about 10-microns thick.

As shown in FIG. 3B, interconnect array 16 includes, in this embodiment, at least one pair of conductive traces 60 and 62 which are arranged overlay alignment in two layers of the interconnect trace array 16. A first insulating polyimide (a flexible polymeric resinous material) layer 25 isolates the first (inner) trace 60 from the thin stainless steel flexure 14. A second insulating polyimide thin film layer 27 (e.g. 10-microns thick) separates and electrically isolates the first trace 60 from a second trace 62. Although not strictly required, an additional insulation layer or coating of dielectric material of e.g. about 4-microns thickness (not shown) may be provided to protect the traces 60 and 62.

The spacing between the conductors 60 and 62 is governed principally by manufacturing tolerances. The smaller the spacing dimension, the lower the inductance of the trace array service loop formed by conductors 60 and 62. Since the thickness dimension of the dielectric layer 27 between the traces 60 and 62 in the FIG. 3B example is on the order of 10 microns, the inductance is greatly reduced, which may be very desirable, particularly for current carrying trace pairs leading to an inductive write element in the head structure.

On the other hand, the FIG. 3B arrangement creates significantly greater inter-trace conductor capacitance levels than present when the traces are arranged in a side-by-side arrangement with e.g. a minimum separation along adjacent trace edges of approximately 10 microns. Also, the FIG. 3B traces 60 and 62 may be disadvantaged at high signal frequencies by a significant capacitance to a ground plane. The electrical ground plane is presented by the facing surface of the stainless steel flexure 14. The resultant unwanted capacitive coupling to the flexure may be overcome in large measure by providing a longitudinal window or recess in the flexure 14 directly underneath the traces 60 and 62, in accordance with the teachings of commonly assigned, codepending U.S. patent application Ser. No. 08/720,836 filed on Oct. 3, 1997 for "Suspension with Integrated Conductors Having Trimmed Impedance", the disclosure thereof being incorporated herein by reference. A longitudinal channel 28 formed e.g. by etching or electrodischarge machining, is shown in FIG. 3B in dashed outline.

The width dimension of the relatively flat conductive traces 60 and 62 determines the electrical resistance and inductance properties of the trace. The wider one makes the conductor traces, the lower the resultant resistance and inductance of the trace array service loop at DC and low AC frequencies. However, signals typically flow between the head 26 and the preamplifier/driver circuit 54 at very high frequencies, such as 100 MHz or higher. At these frequencies, skin and proximity effects are present and affect the electrical current density passing through each conductor 60 and 62.

Skin depth (or wave penetration depth) is usually defined as a depth δ into a conductive medium at which the value of an electromagnetic wave amplitude is reduced to $e^{-1}$ (about 37%) of its value at the surface of the conductive medium, and for one-dimensional plane wave propagation can be approximated by:

$$\delta = \frac{1}{\sqrt{\pi f \mu \sigma}} \qquad \text{(Eq. 1)}$$

where:
δ=skin depth in meters,
f=frequency of the electromagnetic wave in hertz,
μ=magnetic permeability of the conductor in henries per meter, and
σ=electrical conductivity of the conductor in siemens per meter.

The solution to Equation 1 is similar for a rectangular conductor cross-section as for a cylindrical conductor circular cross-section; however edge effects at the corners of the rectangle present additional discontinuities which must be taken into account in a practical model. It should also be noted that as the amplitude is attenuating as the wave moves into the conductive medium, the phase is shifting, both in an exponential fashion.

Since, as the signal frequency becomes very high and the interior of the conductive trace will carry less and less current because of skin effect, widening of the conductive traces to reduce resistance and inductance of the trace array becomes a poor design choice.

FIG. 5 graphs the constant current density associated with DC current through e.g. conductor 60. In the FIG. 5 example current flows in equal measure across the section of the conductor 60 in accordance with a relation:

$$J_1 = i/A \qquad \text{(Eq. 2)}$$

where:
J1=current density in amperes per meter,
i=injected current
A=cross-sectional area ($m^2$) (width a times height b).

However, as signal frequency increases from DC to high frequency alternating current, less and less of the interior area of the conductor section is used to carry current, as graphed in FIGS. 6 and 7.

In the FIG. 6 example skin depth δ is approximately equal to the height dimension b, and $J_2 > J_1 > J_3$.

In the FIG. 7 example, f is very high, such as 100 MHz or higher, and the skin depth δ is much much less than the height dimension b. In this example, $J_4 >> J_2 > J_1$. It should be noted that the area under the current density curve is always constant and equal to the total current i.

FIG. 8 suggests that the conductor 60 be split up into an array of parallel smaller conductive segments connected in parallel at terminal ends. The segments 60A, 60B, 60C, 60D, 60E, 60F, 60G, and 60H define in sum the same cross-sectional area as the trace 60. The FIG. 8 arrangement reduces the resistance at high frequencies, but undesirably takes up considerable space (which may not be available on the flexure 14 or assembly 16) and taxes the manufacturing process tolerances by adding considerable complexity.

FIG. 9 suggests providing a fewer number of segments, such as segments 60J, 60K and 60L. These three segments also define in sum the same cross-sectional area as the trace 60 and provide better resistance and inductance values. Paths of a service loop including the segments of the FIGS. 8 and 9 examples may be interleaved in order to further reduce overall array inductance, in accordance with the teachings of commonly assigned, copending U.S. patent application Ser. No. 08/726,450 filed on Oct. 3, 1996 by Young, for: "Multi-Trace Transmission Lines for R/W Head Interconnect in Hard Disk Drive", now U.S. Pat. No. 5,717,547, the disclosure thereof being incorporated herein by reference.

In accordance with principles of the present invention, an optimized conductor cross-sectional arrangement may be obtained by comparing the conductor trace segment cross sections to the current density at the operating frequency. FIG. 10 presents one example wherein segments 60M, 60N, 60P and 60Q are provided. Outer segments 60M and 60Q have relatively small cross-sections, while inner segments 60N and 60P have greater cross-sections. The wider inner segments 60N and 60P force more current to flow through the middle of the conductor array where high frequency current density would otherwise have been lower.

Another example of an optimized segmented conductor is provided in FIG. 11 wherein three segments 60R, 60S and 60T are provided. Outer segments 60R and 60T are relatively quite small in cross-sectional area, whereas inner segment 60S is relatively quite wide.

Computer-based optimization routines may be employed to obtain optimal dimensions and spacing for the conductor segments, depending upon frequency, and available space on the load beam or flexure, and available complexity and spacing tolerances in the manufacturing process. Obtaining optimal dimensions is therefore an iterative process, since changing the conductor segment widths or areas changes the fields, which changes the current distribution. The goal is to equalize the current distribution across the conductor cross-section wherein the conductor is divided into segments of unequal cross-sectional areas. Controlling spacing between conductive trace segments is as important as controlling areas or widths of the conductor trace segments. One further point to note is that if the optimized conductor layout keeps current-distribution uniform over a desired range of operating high frequencies, the layout will also ensure that the resistance and inductance parameters will also stay reasonably constant over the same frequency range. This consequence suggests in turn that the impedance parameters do not change significantly with frequency over the design range, thus reducing any unpredictable or unwanted phase delays in the circuit service loop. By providing optimized constant current density across the trace conductor segments as a single service loop, optimal use is made of the trace conductor material, which means that conductors may be made narrower than otherwise and provide improved signal transmission performance at very high operating frequencies.

The principles of the present invention may be employed in trace interconnect arrays formed as a single layer, or as multiple layers, such as shown in FIGS. 12 and 13. In the FIG. 12 example, the trace segments 60M, 60N, 60P and 60Q of conductor 60 (shown in FIG. 9) are arranged on a dielectric layer 29 directly above, and laterally aligned with, segments 62M, 62N, 62P and 62Q of conductor 62. Similarly, trace segments 60R, 60S and 60T of conductor 60 are arranged on dielectric layer 29 above, and laterally aligned with, trace segments 62R, 62S and 62T of conductor 62.

While FIGS. 12 and 13 show lateral alignment of the respective trace conductor segments, a controlled lateral offset may be employed between the segments of conductor 60 relative to the segments of conductor 62 in order to control inter-conductor capacitance, in accordance with the present inventor's commonly assigned, copending U.S. patent application Ser. No. 08/720,833, filed on Oct. 3, 1996, for: "Suspension with Multi-Layered-Integrated Conductor Trace Array for Optimized Electrical Parameters", now U.S. Pat. No. 08/5,737,152, the disclosure thereof being incorporated herein at this location by reference. Also, an etched-away longitudinal channel 28 may be formed in the flexure 14 directly beneath the lower conductor segment 62, as suggested by the dashed outline in FIG. 12 in accordance with the teachings of the commonly assigned, copending U.S. patent application Ser. No. 08/720,836 already referenced and incorporated hereinabove.

FIG. 14 shows a further multi-layer trace array including asymmetrical segments 60U, 60V and 60W of a conductive path 60 formed on one side of a dielectric layer 29 and asymmetrical segments 62U, 62V and 62W formed on the other side of the insulative layer 29. In this example, cross-sectional areas of outer segments 60U, 60W and 62U, 62W are made smaller by reducing the height dimension rather than the width dimension, relative to the intermediate segments 60V, 62V.

Although the present invention has been described in terms of the presently preferred embodiment, i.e., a segmented conductor trace interconnect array in combination with a flexure structure and head gimbal for a hard disk drive, it should be clear to those skilled in the art that the present invention may also be utilized in conjunction with, for example, an integrated gimbal load beam structure, or other conductive suspension members having proximately mounted, deposited, or embedded conductors with or without insulating overcoatings. Thus, it should be understood that the instant disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An integrated load beam assembly for supporting a read/write head/slider assembly adjacent to a storage medium and for electrically interconnecting the head to read/write circuitry, the load beam assembly comprising:

a generally planar conductive member extending to proximity of the read/write head/slider assembly;

a first electrical insulation layer disposed on the conductive member;

a first electrical trace path disposed on the first electrical insulation layer, the first electrical trace path comprising at least three longitudinal first trace conductor segments, the first segments being connected in parallel at terminal ends, the at least three first segments disposed on the first electrical insulation layer in parallel such that there are two outer first segments and at least one first intermediate segment positioned intermediate the two outer first segments, each first segment having a predetermined generally rectangular cross-sectional area, the intermediate first segment having a predetermined cross-sectional area greater than a predetermined cross-sectional area of a first outer segment in order to optimize current density at very high signaling frequencies.

2. The integrated load beam assembly set forth in claim 1 wherein each first segment has the same cross-sectional height dimension and has a cross-sectional width dimension, and wherein the cross-sectional width dimension of the intermediate first segment is greater than the cross-sectional width dimension of each of the outer first segments.

3. The integrated load beam assembly set forth in claim 1 wherein each first segment has a predetermined cross-sectional width dimension and a predetermined cross-sectional height dimension, and wherein the cross-sectional height dimension of the intermediate first segment is greater than the cross-sectional height dimension of each of the outer first segments.

4. The integrated load beam assembly set forth in claim 1 further comprising:

a second electrical insulation layer disposed on the segments forming the first electrical trace path, a second electrical trace path disposed on the second electrical insulation layer in general longitudinal alignment with the first electrical trace path, the second electrical trace path comprising at least three longitudinal second trace conductor segments, the second segments being connected in parallel at terminal ends, the at least three second segments disposed on the second electrical insulation layer in parallel such that there are two outer second segments and at least one second intermediate segment positioned intermediate the two outer second segments. each second segment having a predetermined generally rectangular cross-sectional area having the same height dimension and having a width dimension, the at least one intermediate second segment having a predetermined cross-sectional width dimension greater than a predetermined cross-sectional width dimension of a second outer segment in order to optimize current density at the very high signaling frequencies.

5. The integrated load beam assembly set forth in claim 1 further comprising two intermediate first segments each having a generally rectangular cross-sectional area substantially equal to a cross-sectional area of the other.

6. The integrated load beam assembly set forth in claim 4 wherein the second trace conductor segments are laterally offset relative to the first trace conductor segments.

7. The integrated load beam assembly set forth in claim 1 within a hard disk drive including at least one rotating data storage disk as the storage medium and a voice coil actuator for positioning the read/write head/slider assembly at data storage locations defined on a storage surface of the data storage disk.

8. The integrated load beam assembly set forth in claim 7 wherein the rotating data storage disk storage surface comprises a magnetic coating.

9. The integrated load beam assembly set forth in claim 1 wherein the generally planar conductive member comprises a flexure forming a gimbal for mounting the read/write head/slider assembly relative to a moving surface of a data storage disk forming the storage medium.

10. A trace interconnect array for connecting a data transducer to electronics circuitry within a data storage device, the array comprising:

a support substrate for supporting a thin dielectric layer, two conductive trace signal paths forming a service loop between a read or write element of the data transducer and the electronics circuitry, each conductive trace signal path comprising at least three segments formed on the thin dielectric layer, the at least three segments arranged substantially coplanar and in parallel such that there are two outer segments and at least one intermediate segment positioned intermediate the two outer segments, the cross-sectional width of the intermediate segment being greater than cross-sectional widths of each of the two outer segments in order to concentrate current density into the at least one intermediate segment in accordance with skin effect at a signaling frequency of information between the data transducer and the electronics circuitry across the service loop.

11. The trace interconnect array set forth in claim 10 wherein there are plural intermediate segments.

12. The trace interconnect array set forth in claim 10 wherein the two conductive trace signal paths comprise a first path having trace segments formed on one surface of the thin dielectric layer and a second path having trace segments formed on an opposite surface of the thin dielectric layer in general longitudinal alignment with the trace segments of the first path.

13. A disk drive comprising:

a base, at least one data storage disk rotating relatively to the base, a voice coil actuator positionable relative to the base and having at least one head arm, a load beam structure attached to a distal end of the at least one head arm, an air bearing slider attached to a distal end of the load beam via a gimbal, the data transducer being formed on a trailing edge of the air bearing slider, the trace interconnect array set forth in claim 10 connecting the data transducer and the electronics circuitry mounted with respect to the base.

14. The disk drive set forth in claim 13 wherein the voice coil actuator comprises a rotary voice coil actuator and the electronics circuitry comprises at least one chip mounted on a side wall of the rotary voice coil actuator.

15. The disk drive set forth in claim 13 wherein the support substrate comprises a flexure attached to the load beam structure for directly supporting the air bearing slider in close flying proximity to the rotating data storage disk.

* * * * *